Patented Nov. 15, 1949

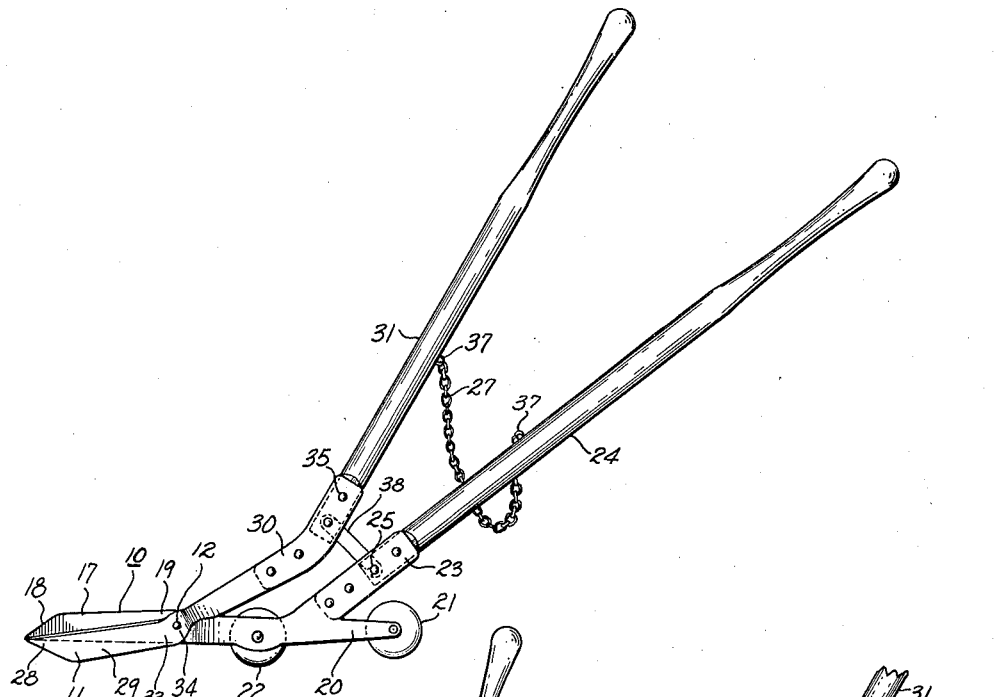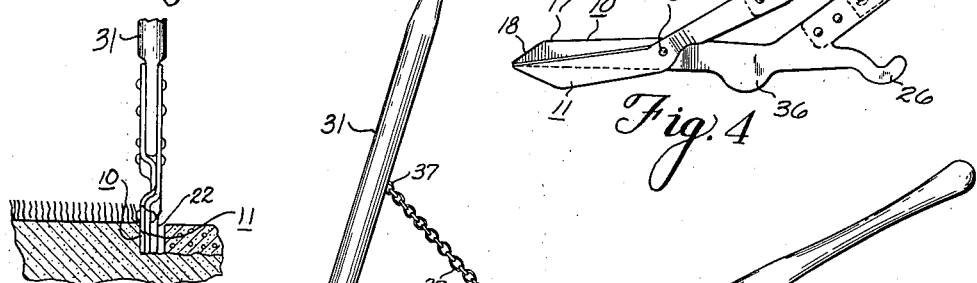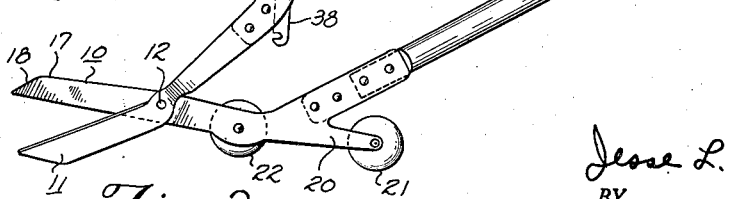

2,488,374

UNITED STATES PATENT OFFICE 2,488,374

SCOOTER LAWN SHEARS

Jesse L. Butler, Cleveland, Ohio

Application October 2, 1947, Serial No. 777,500

2 Claims. (Cl. 56—241)

My application relates in general to lawn shears and in particular to a scooter lawn shears which may be guided along the edge of the lawn and manually operated to trim grass along the edge of the lawn for beautifying the lawn.

Many different types of structures have been designed for trimming the edges of lawns. However, the majority of these structures either compel the operator to crawl along on his hands and knees or are too complicated for mass production and sale. Therefore, one of the objects of my invention is to provide a hand-operated scooter lawn shears that will enable anyone desiring a beautiful lawn to keep it neatly edged and trimmed without having to crawl along on his hands and knees.

It is also an object of my invention to provide a lawn edger or lawn shears which is simple yet sturdy in construction and relieves the operator from back-bending and fatigue which usually results from the use of ordinary shears.

Another object of my invention is to provide a scooter lawn shears for trimming grass along the edge of the lawn which has a guide handle for guiding the shears along the edge of the lawn and has an operable handle for manually operating the lawn shears.

A further object of my invention is to provide a scooter lawn shears which operate easily in a very narrow trench to rim the edge of the lawn.

Other objects and a fuller understanding of my invention may be had by referring to the following description and claims, taken in conjunction with the accompanying drawing, in which:

Figure 1 of my drawing is a side view of my scooter lawn shears with the shear blade portions closed and in cutting engagement;

Figure 2 is a side view of my scooter lawn shears with the shear blade portions open;

Figure 3 is a front view of my scooter lawn shears in a very narrow trench in the lawn, and Figure 4 illustrates a modification of my invention.

In my drawings of the preferred embodiment of my invention, the reference character 10 is directed to a first blade member and the reference character 11 to a second blade member. The first blade member 10 has a forward end 18, a pivot connection portion 19, and a fulcrum extension portion 20. Extending between the forward end 18 and the pivot connection portion 19 of the first blade member is the first or top shear blade portion 17. The second blade member 11 is pivotally connected to the pivot connection portion 19 of the first blade member 10. The second blade member 11 has a second or bottom shear blade portion 29 aligned to cooperatively engage the first shear blade portion 17 for cutting the grass. The second shear blade portion 29 has a forward end 28 which meets the forward end 18 of the first shear blade portion 17 when the blade members are closed.

A guide handle extension portion 23 is integral with the first blade member 10 and disposed between the fulcrum extension portion 20 and the pivot connection portion 19. A guide handle 24 may be fastened by rivets 25 or other suitable means, such for example, bolts to this guide handle extension portion 23 of the first blade member 10.

In the preferred embodiment of my invention I have provided a fulcrum wheel 21 rotatively carried by the fulcrum extension portion 20 of the first blade member 10. A scooter truck wheel 22 rotatively connected to the first blade member 10 between the guide handle extension portion 23 and the pivot connection portion 19 may support the scooter lawn shears. The scooter truck wheel 22 rolls along the edge of the lawn when the shear blade portions are in engagement thus making it easier to use my scooter lawn shears. In addition, this scooter truck wheel 22, pivoted preferably in the center of the fulcrum extension portion, serves the purpose of a balance means enabling the operator to lower or raise the point of the shears whichever is necessary in cutting the grass growing over the edge of the trench or pavement.

The second blade member has a pivot connection portion 33 aligned with the pivot connection portion 19 of the first blade member. A pivot shaft 34 extends through the pivot connection portion 19 and 33 to hold the first and second blade members together. I have provided an operating handle extension portion 30 as an integral part of this second blade member 11. An operating handle 31 may be fastened by rivets 35 or by other suitable means, such for example bolts, to this operating handle extension portion 30. The operating handle extension portion 30 is disposed on one side of the pivot connection portion 33 and the second or bottom shear blade portion 29 is disposed on the other side of the pivot connection portion 33.

My scooter lawn shears is operated by hand by the person desiring to keep the edges of his lawn trimmed to make the lawn more beautiful. To operate the scooter lawn shears the person holds the bottom or guide handle 24 in one hand and the top or operating handle 31 in the other hand. The operating handle 31 and the guide handle 24 are of sufficient length to permit the person to stand erect while shearing the grass along the edge of the lawn. The operator pushes the scooter lawn shears ahead of him and guides the shear blade portions with the bottom or guide handle 24. With his other hand, the operator reciprocates the top or operating handle 31 in an upward and downward direction toward and away from the bottom or guide handle 24. The operator moves the operating handle 31 in the downward direction toward the guide handle 24 to pivotally move the second shear blade portion and the first shear blade portion into cutting engagement to shear blades of grass extending therebetween. The operator moves the top or operating handle 31 upward or away from the guide handle 24 to open the shear blade portions 17 and 29. A chain 27 interconnected between the operating handle 31 and the guide handle 24 prevents moving of the operating handle 31 too great a distance away from the guide handle 24. The ends of this chain may be connected to the handle by screw eyes 37 or by other suitable means. In this open position, the second or bottom shear blade portion 29 of the second blade member 11 and fulcrum wheel 21 carried by the fulcrum extension portion 17 of the first blade member 10 are touching the ground. The scooter lawn shears may be scooted forward by pushing the guide handle 24 forward to place the next portion of uncut grass between the shear blade portions 17 and 29.

As is illustrated in my drawing in Figure 3 my scooter lawn shears are easily used in a vertical plane in very narrow trenches along the edge of the sidewalk. The scooter lawn shears easily travel along in this narrow trench and keep the grass trimmed neatly as it grows over the edge of the trench. The lifting of the bottom shear blade portion toward the top shear blade portion causes the bottom shear blade portion to get under the overhanging grass thereby cutting it neatly along the edge of the trench. There is an upward cutting movement on the part of the bottom shear blade portion in my new and useful scooter lawn shears. I have discovered that this upward cutting movement of the bottom shear blade portion neatly trims the edge of the lawn.

In my description I have figuratively spoken of moving the handles upwardly and downwardly toward the ground. My scooter lawn shears also operate at other angles for trimming the grass around trees, shrubs and small embankments. When the scooter lawn shears are slanted relative to the vertical plane illustrated in Figure 3 the operation of the shears is substantially the same as when the shears are disposed in the vertical plane.

A suitable latch mechanism 38 is connected between the handle extension portions 23 and 30. This latch mechanism may be fastened to the handle extension portions by the rivets 25 and 35 or by other suitable means. When the scooter lawn shears are not in use the handles may be latched together by this suitable latch mechanism 38. Latching of the handles together prevents injury from bumping the shearing portions of the blade members.

In Figure 3 of my drawings I illustrate a modification of my scooter lawn shears. In this modification the fulcrum wheel 21 and the scooter truck wheel 22 have been replaced by enlarging the fulcrum extension portion 20. This enlarged fulcrum extension portion is indicated in Figure 3 by the number 26, and the enlarged truck portion by the number 36. My modification operates substantially the same as the preferred embodiment of my invention.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a scooter lawn shears for trimming the edge of the lawn, a top shear blade, a bottom shear blade pivotally connected to the top shear blade, a fulcrum extension portion integral with the top shear blade, a fulcrum wheel rotatably carried by the fulcrum extension portion, a scooter wheel rotatably mounted on said fulcrum extension portion between the fulcrum wheel and the top shear blade, a guide handle extension portion integrally connected to the fulcrum extension portion between the fulcrum wheel and the scooter wheel and adapted to be fastened to a guide handle, an operating extension portion integrally connected to the bottom shear blade and adapted to be fastened to an operating handle.

2. In a scooter lawn shears for trimming grass along the edge of a lawn, a top shear blade having a forward end and a pivot connection portion, a bottom shear blade pivotally connected to the pivot connection portion of the top shear blade and having a forward end alignable in cutting position with the forward end of the top shear blade, a fulcrum extension portion integral with the pivot connection portion of the top shear blade and extending longitudinally from the top shear blade, a fulcrum wheel rotatively carriable by the fulcrum extension portion to press against the ground when the top and bottom shear blades are in cutting position, a scooter wheel rotatively mounted on said fulcrum extension portion between the fulcrum wheel and the pivot connection portion to carry the scooter lawn shears, a guide handle extension portion integral with the fulcrum extension portion and disposed between the fulcrum wheel and the scooter wheel and adapted to be fastened to a guide handle, an operating handle extension integrally connected to the bottom shear blade and adapted to be fastened to an operating handle, said handles pivotally operating the shear blades to trim the edge of the lawn.

JESSE L. BUTLER.

REFERENCES CITED

The following references are of record in the file of this patent:

UNITED STATES PATENTS

| Number | Name | Date |
| --- | --- | --- |
| 362,104 | Naumann | May 3, 1887 |
| 1,995,251 | Hoskins | Mar. 19, 1935 |

FOREIGN PATENTS

| Number | Country | Date |
| --- | --- | --- |
| 13,105 | Great Britain | June 6, 1906 |